(12) United States Patent
Gauthier et al.

(10) Patent No.: US 9,543,870 B1
(45) Date of Patent: Jan. 10, 2017

(54) BATTERY PACK FUSE MONITORING AND CURRENT LIMITING SYSTEM

(71) Applicant: Atieva, Inc., Menlo Park, CA (US)

(72) Inventors: Jean-Philippe Gauthier, San Francisco, CA (US); Richard J. Biskup, Sunnyvale, CA (US)

(73) Assignee: ATIEVA, INC., Menlo Park, CA (US)

( * ) Notice: Subject to any disclaimer, the term of this patent is extended or adjusted under 35 U.S.C. 154(b) by 54 days.

(21) Appl. No.: 14/814,840

(22) Filed: Jul. 31, 2015

(51) Int. Cl.
*H02P 1/00* (2006.01)
*H02P 7/00* (2016.01)
*B60L 11/18* (2006.01)

(52) U.S. Cl.
CPC .............. *H02P 7/00* (2013.01); *B60L 11/187* (2013.01); *B60L 11/1861* (2013.01); *B60L 11/1864* (2013.01)

(58) Field of Classification Search
CPC .. Y02T 10/7005; Y02T 10/7011; Y02T 10/70; B60W 10/08
USPC ......................................... 318/139, 432, 434
See application file for complete search history.

(56) References Cited

U.S. PATENT DOCUMENTS

| | | | | |
|---|---|---|---|---|
| 7,276,878 B2* | 10/2007 | Phillips | ................... | H02P 29/02 318/432 |
| 7,728,553 B2* | 6/2010 | Carrier | ................ | H01M 2/1022 320/116 |
| 8,093,863 B2* | 1/2012 | Carrier | ................ | H01M 2/1022 320/116 |
| 2009/0139781 A1* | 6/2009 | Straubel | .............. | B60L 11/1875 180/65.1 |
| 2011/0101921 A1* | 5/2011 | An | ........................ | H01M 10/42 320/134 |
| 2012/0293128 A1* | 11/2012 | Kim | ...................... | H02J 7/0016 320/117 |

* cited by examiner

*Primary Examiner* — Rina Duda
(74) *Attorney, Agent, or Firm* — Patent Law Office of David G. Beck

(57) ABSTRACT

A battery pack monitoring system is provided that continually monitors the current at the fuse and, when the system determines that the fuse is close to its operating limit, limits battery pack current by limiting traction motor torque.

12 Claims, 4 Drawing Sheets

BATTERY PACK FUSE MONITORING AND CURRENT LIMITING SYSTEM

FIELD OF THE INVENTION

The present invention relates generally to an electric vehicle battery pack and, more particularly, to a system that monitors battery pack conditions and sets current limits.

BACKGROUND OF THE INVENTION

In response to the demands of consumers who are driven both by ever-escalating fuel prices and the dire consequences of global warming, the automobile industry is starting to embrace the need for ultra-low emission, high efficiency cars. While some within the industry are attempting to achieve these goals by engineering more efficient internal combustion engines, others are incorporating hybrid or all-electric drive trains into their vehicle line-ups.

In recent years, electric vehicles (EVs) have proven to be not only environmentally friendly, but also capable of meeting, if not exceeding, consumer desires and expectations regarding performance, range, reliability, and cost. In order to insure both vehicle reliability and user safety, electric vehicles use a variety of techniques to prevent battery pack abuse as well as mitigate the effects of an unavoidable abusive event (e.g., battery pack damaged during a collision, etc.). Fuses, which may be employed at the battery level, the battery pack level, or both, are one of the primary means of protecting an EV's battery pack. Unfortunately while fuses may be used to provide very effective protection in a low current circuit, due to the high current levels common in an EV the response time of a fuse may be too slow to provide the desired level of protection. This phenomenon is illustrated in FIG. 1 which provides the cutoff current characteristics for a variety of conventional high current fuses ranging from a 300 amp fuse to an 800 amp fuse. As expected, as the current rating of the fuse increases, so does the time it takes to blow the fuse for a given current level. For example for this set of exemplary fuses, a 300 amp fuse subjected to 1000 amps of current will take approximately 8 seconds to blow while a 600 amp fuse may take as much as 200 seconds to blow at the same current level. Subjecting an EV's electrical system to an overcurrent of such magnitude and for such an extended period of time may damage the battery pack as well as any of a variety of other system components (e.g., motor, motor controller, accessory systems, etc.). To avoid this problem, the fuse within an EV's power train may be undersized, thus insuring that the fuse will blow quickly. Unfortunately undersizing the fuse may also lead to it blowing prematurely during routine vehicle use, albeit typically only under extreme conditions (e.g., high temperature conditions).

Accordingly, what is needed is a system that allows the use of an undersized fuse in order to provide rapid response to excessive currents while still insuring that the fuse will not blow during normal vehicle operation. The present invention provides such a system.

SUMMARY OF THE INVENTION

The present invention provides a method of limiting motor torque in an electric vehicle (EV), where the EV includes an electrical system comprised of a battery pack coupled to a motor, and where the method includes the steps of (i) measuring a battery pack current (i), where the battery pack current passes through the battery pack fuse; (ii) determining a characteristic of the electrical system, where the characteristic relates to a difference between the battery pack current and the operating limit of the battery pack fuse; (iii) determining a current limit based on the characteristic of the electrical system; (iv) determining a battery discharge current limit ($I_{max}$) and a battery charge current limit ($I_{min}$) from the current limit; (v) setting a maximum motor discharge power ($MP_{max}$), where $MP_{max}$ is defined as $MP_{max}=I_{max}V_{dc}$, and where $V_{dc}$ corresponds to the battery pack voltage; (vi) setting a maximum motor charge power ($MP_{min}$), where $MP_{min}$ is defined as $MP_{min}=I_{min}V_{dc}$; (vii) calculating a motor efficiency (eff), where the motor efficiency is comprised of a plurality of power losses corresponding to motor losses and non-motor electrical system losses; and (viii) determining a first set of motor torque limits corresponding to positive rotor speeds and a second set of motor torque limits corresponding to negative rotor speeds, where the first and second sets of motor torque limits are based on $MP_{max}$, $MP_{min}$, eff and rotor speed ($\omega$). The method may further comprise the steps of (i) receiving a torque demand, where the torque demand is generated by a user depressing an accelerator pedal of the EV; and (ii) issuing a limited torque demand based on the torque demand and the first and second sets of motor torque limits.

In one aspect, the step of determining the characteristic of the electrical system further comprises the steps of (i) determining an accumulation gain (AG) of the electrical system, where AG is defined as $AG(i)=100/CT(i)$; and (ii) determining a thermal reserve (TR) of the electrical system, where TR is defined as $TR(k)=TR(k-1)-(dt*AG(i))$, where $TR(k)$ corresponds to an actual thermal reserve, $TR(k-1)$ corresponds to a thermal reserve calculated at the previous time step, dt corresponds to a sample time, and where the battery pack fuse is characterized by a fuse cutoff time (CT) and where the operating limit of the battery pack fuse corresponds to the CT. The method may further comprise the step of comparing the TR to a preset value, wherein if the TR is less than the preset value a battery contactor is opened. The step of determining $I_{max}$ and $I_{min}$ may be further comprised of determining $I_{max}$ and $I_{min}$ from the current limit and a set of battery pack conditions (e.g., battery pack temperature and battery pack state of charge). When the motor is discharging the battery pack, the efficiency is defined by the quotient of the motor mechanical power divided by the battery pack electrical power. When the motor is charging the battery pack, the efficiency is defined by the quotient of the battery pack electrical power divided by the motor mechanical power. The first set of motor torque limits, which apply when $\omega>0$ so the EV is moving forwards, may be comprised of a maximum torque limit ($T_{q\ max}$) and a minimum torque limit ($T_{q\ min}$), where $T_{q\ max}=[(MP_{max} \times eff)/(|\omega|)]$ and $T_{q\ min}=[(MP_{min} \times 1/eff)/(|\omega|)]$. The second set of motor torque limits, which apply when $\omega<0$ so the EV is moving backwards, may be comprised of a maximum torque limit ($T_{q\ max}$) and a minimum torque limit ($T_{q\ min}$), wherein $T_{q\ max}=[(MP_{min} \times 1/eff)/(|\omega|)]$ and $T_{q\ min}=-[(MP_{max} \times eff)/(|\omega|)]$.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 1 illustrates the cutoff current characteristics of a variety of conventional high current fuses.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations or components, these steps, calculations or components should not be limited by these terms, rather these terms are only used to distinguish one step, calculation or component from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

In accordance with the invention, a monitoring system is provided that continually monitors the current at the fuse and, when the system determines that the fuse is close to its operating limit, limits battery pack current by limiting traction motor torque. Since the biggest power consumer in an EV is the traction motor, limiting traction motor torque is the most effective way to limit the battery pack current.

Figure 1:
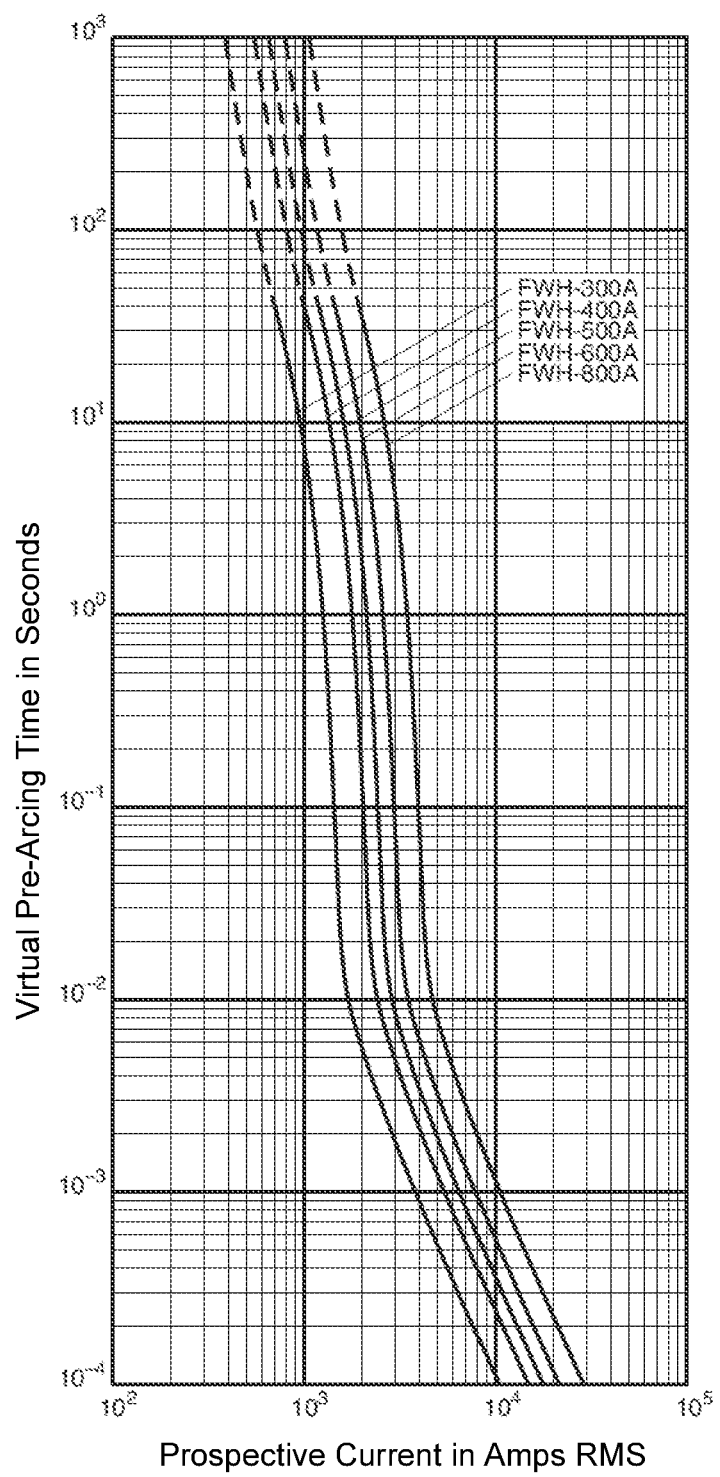
Figure 2:
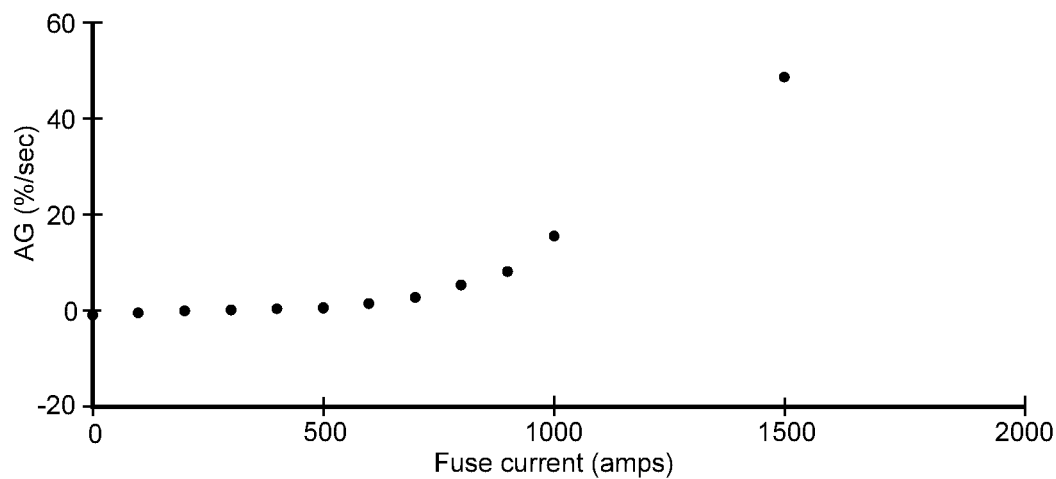
FIG. 2 provides a graph of accumulation gain versus fuse current.

The monitoring system of the invention is based on a characteristic referred to herein as the Accumulation Gain (AG). The accumulation gain for currents above the fuse rating is defined as:

$AG(i)=100/CT(i)$, where CT refers to the cutoff time and is given relative to the current, i, at the fuse. The data required to derive the accumulation gain is provided for the fuse in question using a fuse characteristic curve such as the curves shown in FIG. 1. Note that when the current is equal to the fuse rating the accumulation gain is set to 0, while at currents below the fuse rating the accumulation gain is set to less than 0 to take into account the fuse cooling off at low current levels. FIG. 2 provides an exemplary graph of accumulation gain versus fuse current, where the fuse in question is the 300 amp fuse notated as FWH-300A in FIG. 1.

Figure 3:
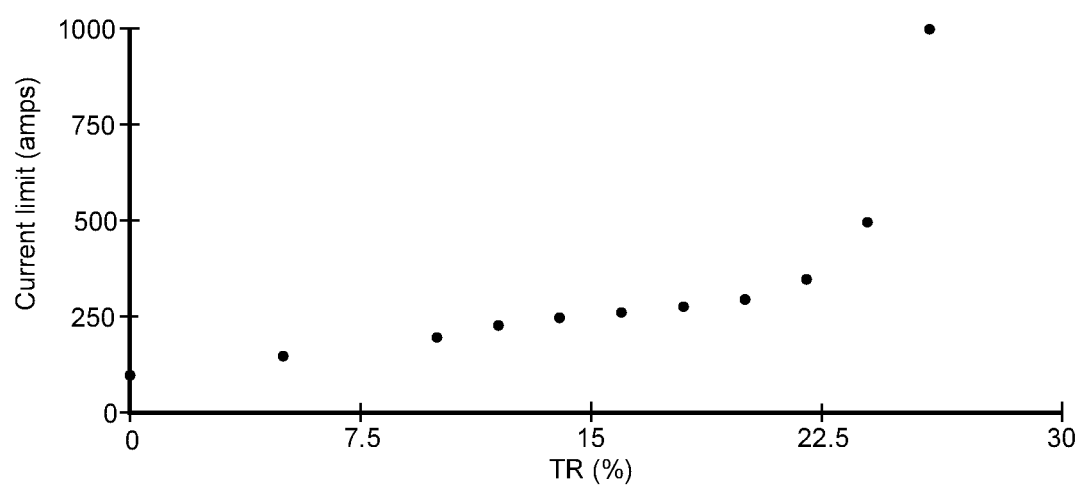
FIG. 3 provides a graph of the thermal reserve versus fuse current based on the accumulation gain shown in FIG. 2.

The accumulation gain derived above is used to derive a second characteristic, Thermal Reserve (TR), which defines how close the fuse is to its cutoff point. The thermal reserve is defined as:

$TR(k)=TR(k-1)-(dt*AG(i))$, where $TR(k)$ is the actual thermal reserve, $TR(k-1)$ is the thermal reserve calculated at the previous time step, and dt is the sample time. The initial value for the thermal reserve, $TR(0)$, is 100%. To protect the battery pack, the current is limited according to the thermal reserve. FIG. 3 provides a graph of the thermal reserve versus the current limit for the 300 amp fuse notated as FWH-300A in FIG. 1, and used in the calculation of the accumulation gain shown in FIG. 2.

Figure 4:
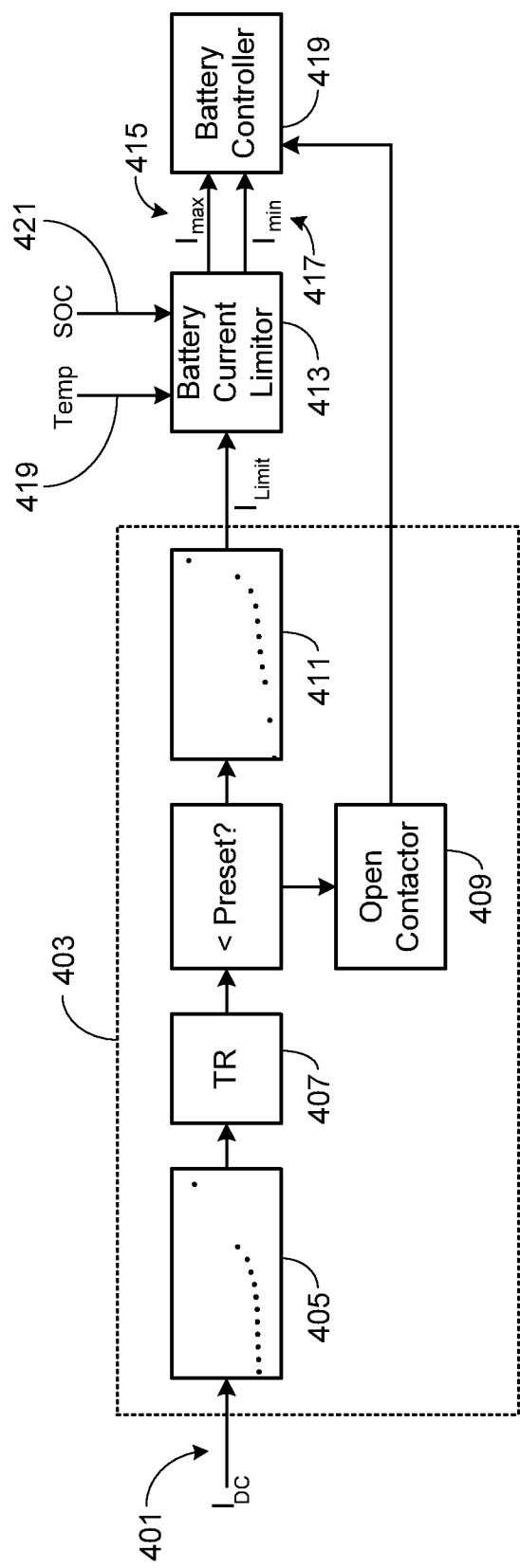
FIG. 4 provides a schematic of the fuse monitoring and current limiting system of the invention.

FIG. 4 provides a schematic of the fuse monitoring and current limiting system of the invention. As shown, the current at the fuse is measured and provided as input 401 to the fuse monitoring system 403. The fuse monitoring system determines the accumulation gain 405 and the thermal reserve 407 based on current input 401 and the fuse characteristics. If the thermal reserve is less than a preset value, for example −100%, then it is assumed that the fuse is defective and the battery contactor 409 is opened in order to protect the vehicle's electrical system. If the thermal reserve is greater than the preset value, the current limit 411 is determined as described above relative to FIG. 3. Current limit 411, which is determined from the thermal reserve, is provided as an input to the battery current limitation manager 413. The battery current limitation manager sets the battery discharge current limit 415 and the battery charge current limit 417 based on the current limit determined from the thermal reserve. Preferably in addition to the current limit determined from the thermal reserve, the current limitation manager also sets current limits 415 and 417 based on battery pack conditions such as the battery pack's current temperature 419 and state of charge (SOC) 421. Battery pack temperature 419 affects current limits since both charge and discharge currents are lower at low temperatures, and both charge and discharge currents are limited when the batteries are overheating. Regarding SOC 421, the charge current limit is lower while the SOC is higher since there is less headroom for charge; similarly, the discharge current limit is lower when the SOC is low since there is less headroom for discharge.

The battery controller 419 sends the positive discharge current limit 415 ($I_{max}$) and the negative charge current limit 417 ($I_{min}$) to the torque controller 501 which, in turn, sets the maximum motor discharge and charge powers based on those battery currents. Battery controller 419 also provides the current at the fuse ($I_{DC}$) and the battery pack voltage ($V_{DC}$) to torque controller 501. The maximum discharge current limit 415 defines the maximum discharge power (i.e., $MP_{max}=I_{max}V_{dc}$), which applies when the traction motor is accelerating the vehicle. As such, $MP_{max}$ represents the maximum power the motor can consume from the battery pack while respecting the discharge current limit, $I_{max}$. The maximum charge current limit 417 defines the charge power (i.e., $MP_{min}=I_{min}V_{dc}$), which applies when the traction motor is decelerating the vehicle. Accordingly, $MP_{min}$ represents the maximum power the motor can send to the battery pack while respecting the charge current limit, $I_{min}$.

Torque controller 501 calculates the motor efficiency (eff) when the motor is discharging the battery by dividing the motor mechanical power, $T_{q\omega}$, by the battery electrical power, $I_{dc}V_{dc}$. Conversely, when the motor is charging the battery the efficiency is given by the battery electrical power, $I_{dc}V_{dc}$, divided by the motor mechanical power, $T_{q\omega}$. It will be appreciated that these efficiency values are comprised of both the power losses in the motor as well as the power consumed by non-motor electrical subsystems and accessories 503.

Using the efficiencies calculated above as well as the previously determined maximum discharge and charge powers $MP_{max}$ and $MP_{min}$, respectively, torque controller 501 determines the positive and negative torque limits. Specifically, for positive rotor speeds (i.e., $\omega>0$ so the EV is moving forwards), the maximum torque limit, $T_{q\ max}$, is defined as $T_{q1}$, where $T_{q1}$ is equal to $[(MP_{max}\times eff)/(|\omega|)]$. The minimum torque limit, $T_{q\ max}$, for positive rotor speeds is defined as $T_{q2}$, where $T_{q2}$ is equal to $[(MP_{min}\times 1/eff)/(|\omega|)]$. For negative rotor speeds (i.e., $\omega<0$ so the EV is moving backwards), the maximum torque limit, $T_{q\ max}$, is defined as $-T_{q2}$, i.e., $-[(MP_{min}\times 1/eff)/(|\omega|)]$. The minimum torque limit, $T_{q\ min}$, for negative rotor speeds is defined as $-T_{q1}$, i.e., $-[(MP_{max}\times eff)/(|\omega|)]$.

Figure 5:
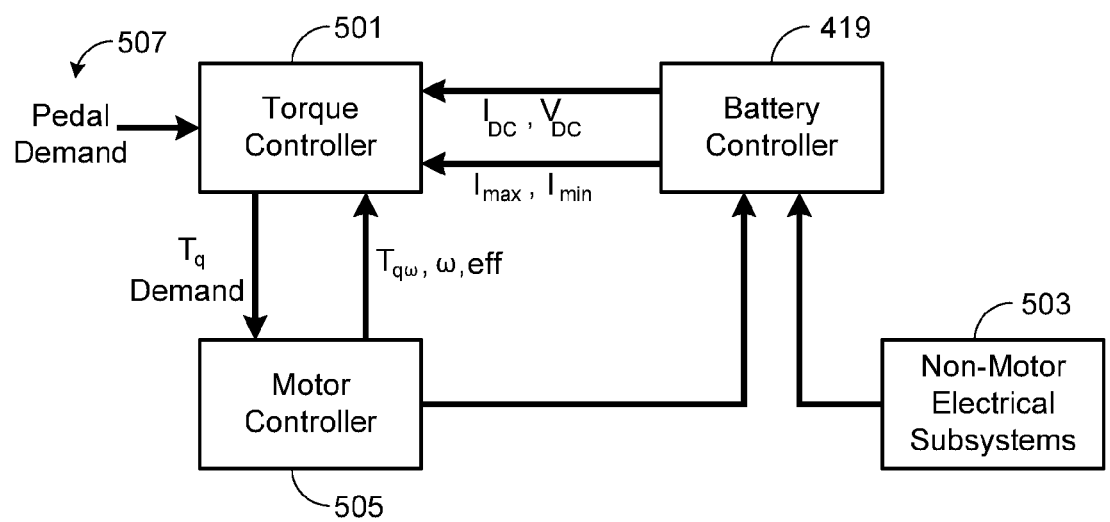
FIG. 5 provides a schematic of the control system used to implement the invention.

FIG. 5 provides a schematic of the control system used to implement the invention. As shown, torque controller 501 uses feedback signals from battery controller 419 and motor controller 505 to limit the motor torque available to the driver when they place a demand on the motor by depressing accelerator pedal 507. As such, when the driver depresses accelerator pedal 507, the torque controller 501 issues a limited torque demand to motor controller 505 that is based on drivetrain efficiency and designed to preserve fuse integrity as noted above.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of limiting motor torque in an electric vehicle, said electric vehicle comprising an electrical system, said electrical system comprising a battery pack coupled to a motor, said method comprising:

measuring a battery pack current (i), wherein said battery pack current passes through a battery pack fuse;

determining a characteristic of said electrical system, wherein said characteristic relates to a difference between said battery pack current and an operating limit of said battery pack fuse;

determining a current limit based on said characteristic of said electrical system;

determining a battery discharge current limit ($I_{max}$) and a battery charge current limit ($I_{min}$) from said current limit;

setting a maximum motor discharge power ($MP_{max}$), wherein said $MP_{max}$ is defined by $MP_{max}=I_{max}V_{dc}$, where $V_{dc}$ corresponds to a battery pack voltage;

setting a maximum motor charge power ($MP_{min}$), wherein said $MP_{min}$ is defined by $MP_{min}=I_{min}V_{dc}$;

calculating a motor efficiency (eff), wherein said motor efficiency is comprised of a plurality of power losses corresponding to motor losses and non-motor electrical system losses; and determining a first set of motor torque limits corresponding to positive rotor speeds and a second set of motor torque limits corresponding to negative rotor speeds, wherein said first and second sets of motor torque limits are based on said $MP_{max}$, said $MP_{min}$, said eff and a rotor speed ($\omega$).

2. The method of claim 1, wherein said battery pack fuse is characterized by a fuse cutoff time (CT), wherein said operating limit of said battery pack fuse corresponds to said CT, and wherein said step of determining said characteristic of said electrical system further comprises:

determining an accumulation gain (AG) of said electrical system, wherein said AG is defined by $AG(i)=100/CT(i)$; and determining a thermal reserve (TR) of said electrical system, wherein said TR is defined by $TR(k)=TR(k-1)-(dt*AG(i))$, where $TR(k)$ corresponds to an actual thermal reserve, $TR(k-1)$ corresponds to a thermal reserve calculated at a previous time step, and dt corresponds to a sample time.

3. The method of claim 2, further comprising comparing said TR to a preset value, wherein if said TR is less than said preset value a battery pack contactor is opened.

4. The method of claim 2, said step of determining said $I_{max}$ and $I_{min}$ further comprising determining said $I_{max}$ and $I_{min}$ from said current limit and a set of battery pack conditions.

5. The method of claim 4, wherein said set of battery pack conditions are comprised of at least one of a battery pack temperature and a battery pack state of charge.

6. The method of claim 2, wherein when said motor is discharging said battery pack said eff is defined by a quotient of a motor mechanical power divided by a battery pack electrical power.

7. The method of claim 2, wherein when said motor is charging said battery pack said eff is defined by a quotient of a battery pack electrical power divided by a motor mechanical power.

8. The method of claim 2, wherein said first set of motor torque limits is comprised of a maximum torque limit ($T_{q\ max}$) and a minimum torque limit ($T_{q\ min}$), wherein $T_{q\ max}=[(MP_{max}\times eff)/(|\omega|)]$ and $T_{q\ min}=[(MP_{min}\times 1/eff)/(|\omega|)]$.

9. The method of claim 8, wherein said first set of motor torque limits is applicable when said EV is moving forwards.

10. The method of claim 2, wherein said second set of motor torque limits is comprised of a maximum torque limit ($T_{q\ max}$) and a minimum torque limit ($T_{q\ min}$), wherein $T_{q\ max}=[(MP_{min}\times 1/eff)/(|\omega|)]$ and $T_{q\ min}=-[(MP_{max}\times eff)/(|\omega|)]$.

11. The method of claim 10, wherein said second set of motor torque limits is applicable when said EV is moving backwards.

12. The method of claim 1, further comprising:
receiving a torque demand, wherein said torque demand is generated by a user depressing an accelerator pedal of said electric vehicle; and
issuing a limited torque demand based on said torque demand and said first and second sets of motor torque limits.

\* \* \* \* \*